United States Patent
Ohashi et al.

(12)

(10) Patent No.: US 6,251,818 B1
(45) Date of Patent: Jun. 26, 2001

(54) ACCELERATOR FOR CYANOACRYLATES

(75) Inventors: Yoshiharu Ohashi, Nagoya; Mitsuyoshi Sato, Kuwana, both of (JP)

(73) Assignee: Toagosei Co., Ltd., Tokyo (JP)

( * ) Notice: Subject to any disclaimer, the term of this patent is extended or adjusted under 35 U.S.C. 154(b) by 0 days.

(21) Appl. No.: 09/385,767

(22) Filed: Aug. 30, 1999

(30) Foreign Application Priority Data

Sep. 3, 1998 (JP) .................................................. 10-263895

(51) Int. Cl.$^7$ ................................. B01J 31/00; B01J 31/18

(52) U.S. Cl. .......................... 502/167; 502/150; 502/162; 502/159; 502/172

(58) Field of Search .................................. 502/150, 162, 502/167, 159, 172

(56) References Cited

U.S. PATENT DOCUMENTS 4,711,936 * 12/1987 Shibanai et al. ...................... 525/485
5,855,916 * 1/1999 Chiesi et al. .......................... 424/488

FOREIGN PATENT DOCUMENTS 59-66471    4/1984   (JP) .

* cited by examiner

*Primary Examiner*—Elizabeth D. Wood
(74) *Attorney, Agent, or Firm*—Cooper & Dunham LLP; Robert D. Katz

(57) ABSTRACT

An accelerator for cyanoacrylates including an inclusion compound having an aromatic amine as a guest compound in the invention is effective as a pretreatment agent in adhering various materials to be adhered using a cyanoacrylate adhesive and as a post-treatment agent in filling adhesion or raising adhesion. Further, this accelerator has almost no unpleasant odor. Accordingly, it improves a working environment remarkably.

13 Claims, No Drawings

ACCELERATOR FOR CYANOACRYLATES

BACKGROUND OF THE INVENTION

1. Field of the Invention

The present invention relates to an accelerator which is used to accelerate the polymerization of cyanoacrylates. More specifically, the invention relates to an accelerator for cyanoacrylate adhesives which are accepted currently and widely in various industrial fields. That is, the accelerator of the invention is suitably used as a pretreatment agent for adhering various adherends by using a cyanoacrylate adhesive more quickly or as an efficient post-treatment agent in the gap-filling adhesion or the mounting adhesion.

2. Description of the Related Art

Since a cyanoacrylate adhesive usually consists of one component, is curable at an ambient temperature, and can bond many kinds of material, it is widely used. However, it is not satisfactory because a gap-filling property, consequently, porous materials such as wood are not well bonded therewith, and mounting adhesion is impossible, and blooming is occurred around an adhered portion of an the work piece due to overflowing of the cyanoacrylate.

In order to solve such problems, others have attempted to improve the rate of polymerization of a cyanoacrylate. Therefore, variety of accelerators have been proposed. For example, JP-B-47-8718 discloses a method in which a surface of an adherend is treated with an accelerator solution containing dimethylaniline or/and tris[1-(2-methyl) aziridinyl]phosphine oxide. JP-B-49-12094 discloses a same method and an accelerator solution containing the specific amine, amide or imide. JP-B-51-25441 discloses vinyl ethers or vinylthioethers as accelerators. JP-B-54-19416 discloses N,N-dimethyl-m-toluidine. JP-B-62-12279 discloses a specific surfactant. JP-B-60-24826 discloses methylolurea and melamine, partially alkoxidized or derivatives thereof.

Among these accelerators, amines are especially effective. However, the amines have brought an older problem Accordingly, some method of controlling occurrence of the amine odor or masking the same has been proposed. For example, JP-B-62-29471 discloses a composition composed of N,N-di-lower alkyl toluidine, saccharin and ascorbic acid or isoascorbic acid. JP-A-59-66471 discloses a mixture of an amine compound, a deodorant and a solvent, respectively. Further, other methods attempt to solve the problem by using amines having high-boiling points. For example, JP-A-6-57218 discloses amines in which at least one hydrocarbon group indicated by R of $R_3N$ is a long-chain hydrocarbon group having from 8 to 24 carbon atoms and JP-A-5-247412 discloses a nitrogen-containing compound having a dimethylaminoethyloxycarbonyl group or a specific tertiary amine.

In these related techniques, however, the efficiency of acceleration and the control of the odor of the amine were inconsistent. That is, a composition having a satisfactory efficiency in acceleration did not satisfactorily control the odor of the amine.

On the other hand, a composition which satisfactorily controls the odor of the amine was unsatisfactory in the efficiency of accelerations, especially curing efficiency.

SUMMARY OF THE INVENTION

It is an object of the invention to provide, an accelerator for cyanoacrylates almost free from an unpleasant odor and having a high efficiency of acceleration in both case when used in pretreatment post-treatment.

The present inventors have found that the characteristic amine odor of the accelerant is decreased by using an aromatic amine in the host compound if an inclusion compound and results in highly efficient acceleration in both pretreatment and post-treatment.

That is, the invention relates to an accelerator for cyanoacrylates comprising an inclusion compound which has a host compound and an aromatic amine as a guest substance.

DESCRIPTION OF THE PREFERRED EMBODIMENT

The accelerator for cyanoacrylates in the invention is described in detail below.

Aromatic Amine

As the aromatic amine used in the invention, a compound represented by formula (1) is preferable because of a high efficiency of acceleration:

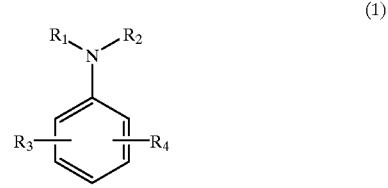

(1)

wherein $R_1$ and $R_2$ may be the same or different, and each represents hydrogen or an alkyl group having from 1 to 3 carbon atoms, and $R_3$ and $R_4$ may be the same or different, and each represents hydrogen, a methyl group or a hydroxyl group.

Specific examples thereof include aniline, o-toluidine, m-toluidine, p-toluidine, N-methylaniline, N-ethylaniline, N-n-propylaniline, N-isopropylaniline, N-methyl-o-toluidine, N-methyl-m-toluidine, N-methyl-p-toluidine, N-ethyl-o-toluidine, N-ethyl-m-toluidine, N-ethyl-p-toluidine, N,N-dimethylaniline, N,N-diethylaniline, N,N-di-n-propylaniline, N,N-diisopropylaniline, N-methyl-N-ethylaniline, N-methyl-N-n-propylaniline, N-ethyl-N-n-propylaniline, N,N-dimethyl-o-toluidine, N,N-dimethyl-m-toluidine, N,N-dimethyl-p-toluidine, N, N-diethyl-o-toluidine, N, N-diethyl-m-toluidine, N, N-diethyl-p-toluidine and N, N-dimethyl-3-aminophenol.

Among them, the tertiary amines are preferable. N,N-dimethylaniline, N,N-dimethyl-p-toluidine and N,N-dimethyl-3-aminophenol are especially preferable aromatic amines in view of both the odor and the efficiency of acceleration.

Host Compound Constituting the Inclusion Compound of the Invention

As the host compound constituting the inclusion compound of the invention, various compounds including Hemicarcerand as described in *J. Am. Chem. Soc.,* vol. 116, page. 111 (1994) can be used. Cyclodextrins and derivatives thereof are preferable because the inclusion compound of the aromatic amine may easily be formed.

Cyclodextrins are cyclic oligosaccharides, and those having 6, 7 and 8 D-glucopyranoses as structural units are generally called α-, β- and γ-cyclodextrins. The cavity of cyclodextrins is formed from a CH linkage and an ether linkage, and is in a hydrophobic atmosphere. Thus, cyclodextrins are compounds in which hydrophobic aromatic amines can be included in this cavity.

Cyclodextrins and derivatives thereof are represented by formula (2).

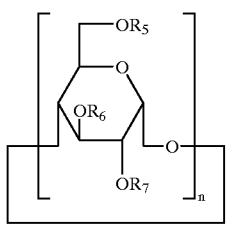

(2)

wherein
$R_5$, $R_6$ and $R_7$ may be the same or different, each represents hydrogen, an alkyl group, an alkenyl group, a cycloalkyl group, an alkylaryl group, an acyl group, a trialkylsilyl group, a urethane group or a monochlorotriazinyl group, and these groups may have a substituent such as a hydroxyl group, an alkoxyl group or a halogen atom and may have an ether linkage or an ester linkage, and n is 6, 7 or 8.

Specific examples of cyclodextrins and derivatives thereof used in the invention include α-cyclodextrin, β-cyclodextrin, γ-cyclodextrin, methyl-α-cyclodextrin, methyl-β-cyclodextrin, methyl-γ-cyclodextrin, hydroxypropyl-β-cyclodextrin, 2,6-di-n-butyl-β-cyclodextrin, 2,6-di-n-butyl-3-acetyl-β-cyclodextrin, triacetyl-β-cyclodextrin, trimethylsilyl-β-cyclodextrin and monochlorotriazinyl-β-cyclodextrin.

Among them, derivatives in which hydroxyl groups of cyclodextrins are completely or partially substituted, are preferable to facilitate solubility in water or an organic solvent. Especially preferable derivatives are methyl-β-cyclodextrin, hydroxypropyl-β-cyclodextrin and triacetyl-β-cyclodextrin.

In the production of the inclusion compound of the aromatic amine and the host compound, the ratio of the aromatic amine to the host compound is preferably between 1:0.5 and 1:2, more preferably between approximately 1:1, because the inclusion compound is thereby easily obtained. The inclusion compound of the aromatic amine used in the invention can easily be produced by a general method such as a kneading method, a saturated solution method or a powder mixing method. The inclusion method will specifically be described in Examples later.

The inclusion compound of the aromatic amine used in the invention is usually solid, and it can be used well, as such, as an accelerator for cyanoacrylates. However, the use of this compound which is dissolved in a solvent is preferable because it can uniformly be coated on a substrate. A solvent compatible with the inclusion compound is preferable for use. Solvents having a relatively high polarity, such as water, a lower alcohol, a lower ether, a lower ketone or a lower ester, are preferable because of the high solubility of the inclusion compound therein. What is meant herein by lower alcohols is an alcohol of one to five carbon atoms. Specific examples of solvents include methanol, ethanol, isopropyl alcohol, diethyl ether, diisopropyl ether, dibutyl ether, acetone, methyl ethyl ketone, diethyl ketone, ethyl acetate, isopropyl acetate and butyl acetate. Especially preferable solvents are methanol, ethanol and acetone.

When the inclusion compound of the aromatic amine used in the invention is used in the form of a solution, the amount of the inclusion compound in the solution is not particularly limited. It is preferably between 0.1 and 50% by weight, more preferably between 1 and 30% by weight. When it is less than 0.1% by weight, a satisfactory acceleration for curing cyanoacrylates is hardly exhibited. When it exceeds 50% by weight, the amine odor tends to be increased. Thus, neither case is desirable.

When the accelerator for cyanoacrylates in the invention is used in the form of a solution, it may be used with a flavor, a deodorant, a dye and a fluorescent pigment.

Cyanoacrylates

As cyanoacrylates to which the accelerator of the invention is applied, 2-cyanoacrylates represented by formula (3) are mentioned.

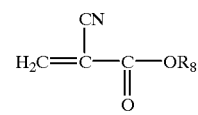

(3)

wherein
$R_8$ represents an alkyl group, an alkenyl group, a cyclohexyl group, a phenyl group, a halogenated alkyl group, an alkoxyalkyl group or a tetrahydrofurfuryl group.

Specific examples thereof include methyl-2-cyanoacrylate, ethyl-2-cyanoacrylate, propyl-2-cyanoacrylate, isopropyl-2-cyanoacrylate, butyl-2-cyanoacrylate, isobutyl-2-cyanoacrylate, amyl-2-cyanoacrylate, hexyl-2-cyanoacrylate, cyclohexyl-2-cyanoacrylate, octyl-2-cyanoacrylate, 2-ethylhexyl-2-cyanoacrylate, allyl-2-cyanoacrylate, benzyl-2-cyanoacrylate, methoxyethyl-2-cyanoacrylate, ethoxyethyl-2-cyanoacrylate, methoxypropyl-2-cyanoacrylate and tetrahydrofurfuryl-2-cyanoacrylate. These 2-cyanoacryltes may be used alone or as a mixture of two or more of them.

These cyanoacrylates may be blended to be made adhesive with an anionic polymerization inhibitor, a radical polymerization inhibitor, a thickening agent, an accelerator, a coloring agent, a plasticizer, a softening agent, a filler, a flavor and a solvent.

Method of Using the Accelerator of the Invention

A method of using the accelerator of the invention includes, when the accelerator is in the form of a solution, for example, a pretreatment method in which the accelerator is coated or sprayed on a substrate and a cyanoacrylate is then coated thereon and cured, and a post-treatment method in which a cyanoacrylate is coated on a substrate and the accelerator is then coated or sprayed thereon and cured. Both methods are available. Many different types of substrates may be used.

When the accelerator is solid, the accelerator can be held with a tape, and the accelerator a filler for gap-filling adhesion.

Effects

The invention provides desirable effects because the unpleasant odor is controlled by including aromatic amine having strong odor in the host compound and the efficiency of acceleration is increased because the aromatic amine as the guest compound is taken from the inclusion compound in the case of curing the cyanoacrylates.

The present invention is illustrated more specifically by referring to the following Examples and Comparative Examples. However, the invention is not limited thereto.

Production Example 1 of Inclusion Compound

One hundred grams of pure water and 28.8 g (0.022 mols) of methyl-β-cyclodextrin (degree of substitution=1.8) were charged into a four-necked flask fitted with a reflux condenser and a thermometer, and stirred at 50° C. It was confirmed that the solution became uniform, and 2.7 g (0.02 mols) of N,N-dimethyl-p-toluidine were slowly dropwise added thereto. The mixture was stirred at 50° C. for 30 minutes. Subsequently, this solution was allowed to cool for 2 hours while being stirred to obtain a uniform aqueous solution. This aqueous solution was freeze-dried to obtain approximately 29 g of a white powder of an inclusion compound. In the specification, the "degree of substitution" here referred to indicates a rate of substitution of three hydroxyl groups of D-glucopyranose, a structural unit of a cyclodextrin.

Production Example 2 of Inclusion Compound

Fifty grams of acetone and 20.2 g (0.01 mols) of triacetyl-β-cyclodextrin were charged into a four-necked flask fitted with a reflux condenser, and stirred at room temperature. It was confirmed that the solution became uniform, and 1.21 g (0.01 mols) of N,N-dimethylaniline were slowly added thereto dropwise. The mixture was stirred at room temperature for 2 hours. Subsequently, this solution was vacuum-dried at 50° C. to obtain approximately 21 g of a light yellow powder.

(2) Pretreatment effect

Polyethylene test pieces [25 mm (length)×50 mm (width)×3 mm (thickness)] were used. An accelerator was coated on the surface of the first test piece, and dried with air. One drop of "Aron Alpha #201", an instantaneous adhesive supplied by Toagosei Co., Ltd. was added to the second test piece, and the resulting second test piece was adhered to the first test piece. These test pieces were delaminated by hand and the time that lapsed until the adhesive was completely solidified was measured.

(3) Post-treatment effect

"Aron Alpha GEL-10", an instantaneous adhesive supplied by Toagosei Co., Ltd. was added to the surface of the polyethylene test piece, and the accelerator was dropwise added thereto. Then, the surface of the adhesive was pricked with a needle, and a time that lapsed until the adhesive was solidified was measured.

TABLE 1

| | Active ingredient (Inclusion compound in each Example) | Solvent | Concentration of active ingredient (%) | Odor | Pre-treatment effect (sec) | Post-treatment effect (sec) |
|---|---|---|---|---|---|---|
| Example 1 | N,N-dimethyl-p-toluidine/methyl-β-cyclodextrin | methanol | 20 | ○ | 5 | 10 |
| Example 2 | N,N-dimethyl-3-aminophenol/methyl-β-cyclodextrin | ethanol | 10 | ○ | 5 | 15 |
| Example 3 | N,N-dimethylaniline/triacetyl-β-cyclodextrin | acetone | 20 | ○ | 5 | 10 |
| Example 4 | N,N-dimethyl-m-toluidine/triacetyl-β-cyclodextrin | acetone | 30 | Δ | 5 | 10 |
| Example 5 | N,N-dimethyl-p-toluidine/hydroxypropyl-β-cyclodextrin | methanol | 5 | ○ | 15 | 20 |
| Comparative Example 1 | N,N-dimethyl-p-toludine | methanol | 2 | X | 10 | 30 |
| Comparative Example 2 | N,N-dimethyl-m-toluidine | methanol | 20 | X | 5 | 5 |
| Comparative Example 3 | trilaurylamine | methanol | 10 | Δ | 20 | 60 |
| Comparative | trimethoxymethyl-melamine | methanol | 10 | ○ | 60 | >60 |

Example 1 used the compound obtained in Production Example 1 of Inclusion Compound. Example 2 used an inclusion compound which was obtained as in Production Example 1 of Inclusion Compound except that N,N-dimethyl-3-aminophenol was used as an aromatic amine.

Example 3 used the compound obtained in Production Example 2 of Inclusion Compound. Example 4 used an inclusion compound which was obtained as in Production Example 2 of Inclusion Compound except that N,N-dimethyl-m-toluidine was used as an aromatic amine.

Example 5 used an inclusion compound which was obtained as in Production Example 1 of Inclusion Compound except that hydroxypropyl-β-cyclodextrin was used as a cyclodextrin.

Each of these inclusion compounds was dissolved in a solvent shown in Table 1 to prepare an accelerator, and properties were evaluated by the following methods. The results are shown in Table 1.

Evaluation Methods (1) Odor

An odor of an active ingredient of the accelerator was directly inhaled, and qualitatively evaluated.

X: Odor of the aromatic amine itself as a standard
○: Almost no amine odor
Δ: between X and ○.

What is claimed is:

1. An accelerator for cyanoacrylates comprising an inclusion composition which has a host compound and a tertiary amine as a quest substance, wherein the tertiary amine is a compound represented by formula (1)

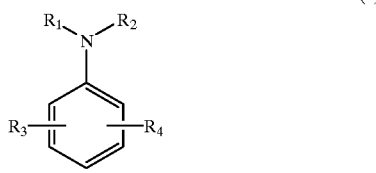

wherein $R_1$ and $R_2$ may be the same or different, and each represents an alkyl group having from 1 to 3 carbon atoms, and $R_3$ and $R_4$ may be the same or different, and each represents hydrogen, a methyl group or a hydroxyl group.

2. The accelerator of claim 1, wherein the inclusion composition is acid free.

3. The accelerator of claim 1, wherein the tertary amine is selected from N,N-dimethylaniline, N,N-dimethyl-p-toluidine and N,N-dimethyl-3-aminophenol.

4. The accelerator of claim 1, wherein a host compound is selected from cyclodextrins and derivatives thereof represented by formula (2)

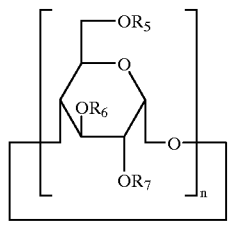
(2)

wherein $R_5$, $R_6$ and $R_7$ may be the same or different, each represents hydrogen, an alkyl group, an alkenyl group, a cycloalkyl group, an alkylaryl group, an acyl group, a trialkylsilyl group, a urethane group or a monochlorotriazinyl group, and these groups may include a hydroxyl group, an alkoxyl group or a halogen atom and may have an ether linkage or an ester linkage, and n is 6, 7 and 8.

5. The accelerator of claim 4, wherein the cyclodextrin derivatives are derivatives in which hydroxyl groups of the cyclodextrins are completely or partially substituted.

6. The accelerator of claim 4, wherein the cyclodextrin derivatives are methyl-β-cyclodextrin, hydroxypropyl-β-cyclodextrin and triacetyl-β-cyclodextrin.

7. The accelerator of claim 1, wherein the inclusion compound is made under the ratio of between 1:0.5, and 1:2 of the tertiary aromatic amine and the host compound.

8. The accelerator of claim 7, wherein the ratio of the tertiary amine and the host compound is approximately 1:1.

9. The accelerator of claim 2, wherein the inclusion compound is dissolved in a solvent.

10. The accelerator of claim 9, wherein the solvent is a polar solvent having.

11. The accelerator of claim 10, wherein the solvent is selected from methanol, ethanol and acetone.

12. The accelerator of claim 9, wherein the amount of the inclusion compound based on the solvent is between 0.1 and 50% by weight.

13. The accelerator of claim 9, wherein the amount of the inclusion compound based on the solvent is between 1 and 30% by weight.

* * * * *

UNITED STATES PATENT AND TRADEMARK OFFICE
CERTIFICATE OF CORRECTION

PATENT NO.   : 6,251,818 B1
DATED        : June 26, 2001
INVENTOR(S)  : Ohashi et al.

It is certified that error appears in the above-identified patent and that said Letters Patent is hereby corrected as shown below:

Column 6, claim 1,
Line 47, delete "quest" and insert -- guest --.

Signed and Sealed this

Fifteenth Day of January, 2002

Attest:

JAMES E. ROGAN
Attesting Officer    Director of the United States Patent and Trademark Office